US012374836B2

(12) United States Patent
Hibino et al.

(10) Patent No.: US 12,374,836 B2
(45) Date of Patent: Jul. 29, 2025

(54) CONNECTOR WITH FIRST AND SECOND CONNECTORS CONNECTABLE TO EACH OTHER, THE FIRST CONNECTOR INCLUDES FIRST HOUSING AND A UTP MODULE WITH INNER CONDUCTORS CONNECTED TO A UTP CABLE, AND THE SECOND CONNECTOR INCLUDES ELECTRICALLY CONDUCTIVE SHIELD MEMBER COVERING THE UTP INNER CONDUCTORS WITH FIRST AND SECOND CONNECTORS CONNECTED

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takuma Hibino, Mie (JP); Hidekazu Matsuda, Mie (JP); Kazuhiro Yoshida, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 364 days.

(21) Appl. No.: 17/872,291

(22) Filed: Jul. 25, 2022

(65) Prior Publication Data

US 2023/0035860 A1 Feb. 2, 2023

(30) Foreign Application Priority Data

Jul. 27, 2021 (JP) ................................ 2021-122070

(51) Int. Cl.
*H01R 13/6585* (2011.01)
*H01R 13/518* (2006.01)
(Continued)

(52) U.S. Cl.
CPC ....... *H01R 13/6585* (2013.01); *H01R 13/518* (2013.01); *H01R 13/6473* (2013.01); *H01R 13/6593* (2013.01); *H01R 13/6463* (2013.01)

(58) Field of Classification Search
CPC .............. H01R 13/6585; H01R 13/518; H01R 13/6473; H01R 13/6593; H01R 13/6463
(Continued)

(56) References Cited

U.S. PATENT DOCUMENTS 6,971,924 B2 * 12/2005 Fujita .................. H01R 13/516 439/701
10,862,247 B2 * 12/2020 Hashimoto ............ H01R 24/50
(Continued)

FOREIGN PATENT DOCUMENTS

JP H02-109279 A 4/1990
JP H06-036829 A 2/1994
(Continued)

*Primary Examiner* — Peter G Leigh
(74) *Attorney, Agent, or Firm* — Venjuris, P.C.

(57) ABSTRACT

A connector is provided with a first connector 10 and a second connector 11 connectable to each other. The first connector 10 includes a UTP module 15. The UTP module 15 includes UTP inner conductors 65 to be connected to wires of a UTP cable 12. The second connector 11 includes an electrically conductive shield member 21 for covering outer peripheries of the UTP inner conductors 65 with the first and second connectors 10, 11 connected.

5 Claims, 9 Drawing Sheets

(51) Int. Cl.
*H01R 13/6473* (2011.01)
*H01R 13/6593* (2011.01)
*H01R 13/6463* (2011.01)

(58) Field of Classification Search
USPC .................................................... 439/607.05
See application file for complete search history.

(56) References Cited

U.S. PATENT DOCUMENTS

| | | | | |
|---|---|---|---|---|
| 10,965,058 | B2 * | 3/2021 | Zheng | H01R 13/428 |
| 11,217,943 | B2 * | 1/2022 | Maesoba | H01R 13/111 |
| 11,387,578 | B2 * | 7/2022 | Karita | H01R 13/506 |
| 11,600,947 | B2 * | 3/2023 | Kirschner | H01R 13/6272 |
| 11,862,891 | B2 * | 1/2024 | Karita | H01R 13/4362 |
| 2004/0203269 | A1 * | 10/2004 | Kameyama | H01R 13/6471 439/108 |
| 2011/0294342 | A1 * | 12/2011 | DeBock | H01R 13/514 439/527 |
| 2018/0102597 | A1 * | 4/2018 | Maesoba | H01R 13/6583 |
| 2019/0013614 | A1 * | 1/2019 | Matsui | H01R 13/6592 |
| 2019/0319406 | A1 * | 10/2019 | Maesoba | H01R 24/22 |
| 2020/0059033 | A1 | 2/2020 | Matsui et al. | |
| 2021/0090763 | A1 * | 3/2021 | Oomori | H01B 11/08 |
| 2023/0033546 | A1 * | 2/2023 | Hiramatsu | H01R 13/514 |
| 2023/0033981 | A1 * | 2/2023 | Matsuda | H01R 13/40 |
| 2023/0034078 | A1 * | 2/2023 | Matsuda | H01R 13/24 |
| 2023/0035860 | A1 * | 2/2023 | Hibino | H01R 13/6594 |

FOREIGN PATENT DOCUMENTS

| | | | | |
|---|---|---|---|---|
| JP | H07-022107 | A | 1/1995 | |
| WO | WO-2018070202 | A1 * | 4/2018 | H01R 13/187 |

* cited by examiner

CONNECTOR WITH FIRST AND SECOND CONNECTORS CONNECTABLE TO EACH OTHER, THE FIRST CONNECTOR INCLUDES FIRST HOUSING AND A UTP MODULE WITH INNER CONDUCTORS CONNECTED TO A UTP CABLE, AND THE SECOND CONNECTOR INCLUDES ELECTRICALLY CONDUCTIVE SHIELD MEMBER COVERING THE UTP INNER CONDUCTORS WITH FIRST AND SECOND CONNECTORS CONNECTED

CROSS-REFERENCE TO RELATED APPLICATIONS

This application is based on and claims priority from Japanese Patent Application No. 2021-122070, filed on Jul. 27, 2021, with the Japan Patent Office, the disclosure of which is incorporated herein in its entirety by reference.

TECHNICAL FIELD

The present disclosure relates to a connector.

BACKGROUND

A connector disclosed in Japanese Patent Laid-open Publication No. 2017-126408 is provided with a STP (Shielded Twisted Pair) module and an UTP (UnShielded Twisted Pair) module. The UTP module and the STP module are called end modules in Japanese Patent Laid-open Publication No. 2017-126408. The UTP module includes UTP inner conductors serving as terminal fittings to be connected to wires of a UTP cable. The STP module includes STP inner conductors serving as terminal fittings to be connected to wires of a STP cable. The STP module is used when faster communication than the UTP module is necessary. In the case of Japanese Patent Laid-open Publication No. 2017-126408, if specifications are changed from first specifications using the STP module to second specifications using the UTP module, a housing can be commonly used. Note that techniques disclosed in Japanese Patent Laid-open Publication Nos. 2004-327419, H07-022107, H06-036829 and H02-109279 are also known as techniques on connectors.

SUMMARY

In the case of Japanese Patent Laid-open Publication No. 2017-126408, an impedance adjusting member serving as a crimp ring is mounted on the wires of the UTP cable to adjust a characteristic impedance. However, if the crimp ring is shortened in response to a request for miniaturization of the connector, there is a problem that the characteristic impedance is degraded.

Accordingly, the present disclosure aims to provide a connector capable of improving a characteristic impedance of a UTP module.

The present disclosure is directed to a connector with a first connector and a second connector connectable to each other, wherein the first connector includes a UTP module, the UTP module includes UTP inner conductors to be connected to wires of a UTP cable, and the second connector includes an electrically conductive shield member for covering outer peripheries of the UTP inner conductors with the first and second connectors connected.

According to the present disclosure, it is possible to provide a connector capable of improving a characteristic impedance of a UTP module.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
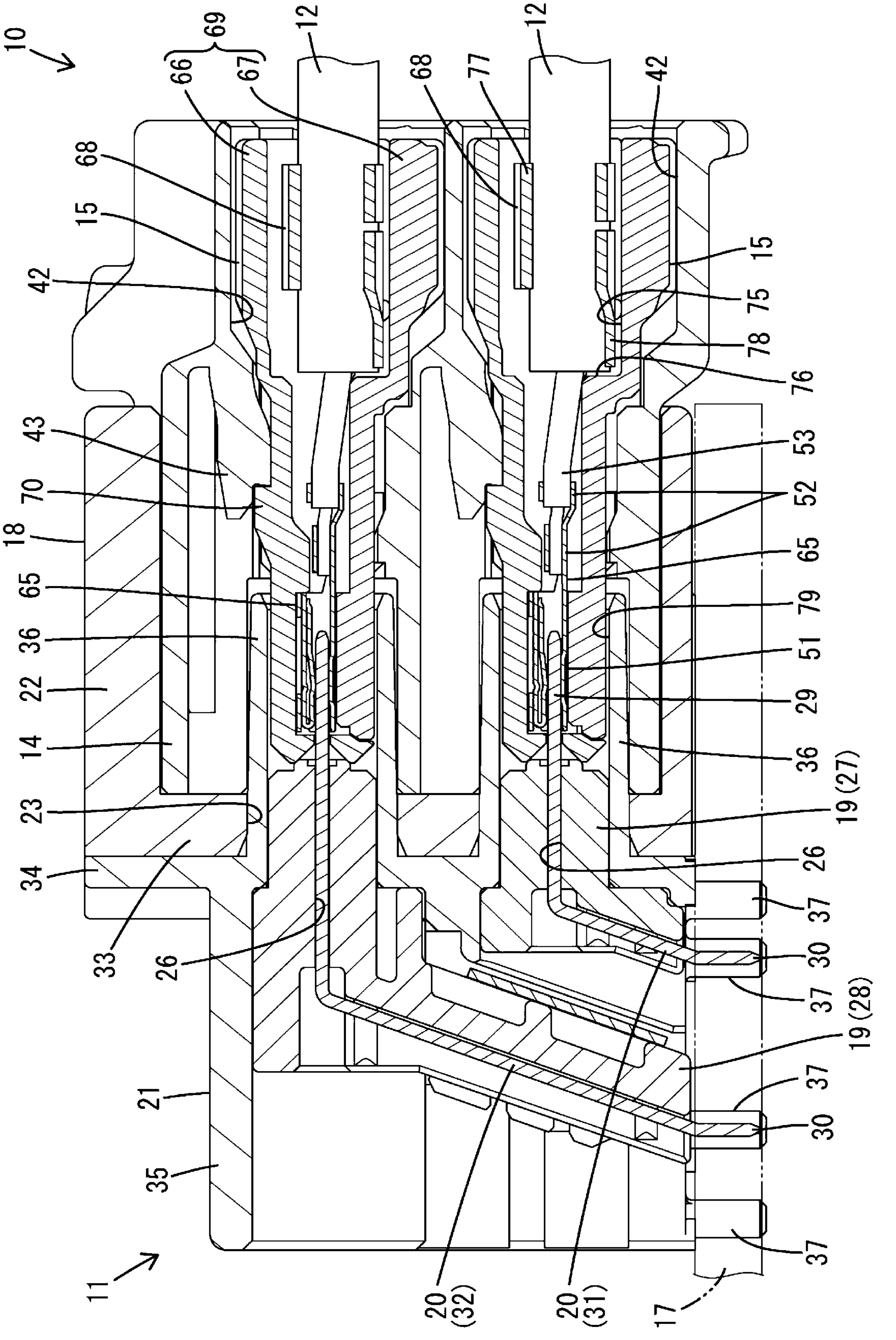
FIG. 1 is a side view in section cut at a position of cavities accommodating UTP modules in a connected state of a first connector and a second connector in a connector of an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure is provided with a first connector and a second connector connectable to each other, wherein the first connector includes a UTP module, the UTP module includes UTP inner conductors to be connected to wires of a UTP cable, and the second connector includes an electrically conductive shield member for covering outer peripheries of the UTP inner conductors with the first and second connectors connected.

If the outer peripheries of the UTP inner conductors are covered by the shield member in this way, a characteristic impedance of the UTP module can be improved.

(2) Preferably, the first connector includes a STP module and a first housing, the STP module includes STP inner conductors to be connected to wires of a STP cable and an outer conductor to be connected to a shield body of the STP cable, the shield member is in contact with the outer conductor with the first and second connectors connected, the first housing includes a plurality of cavities, and the UTP module and the STP module are respectively accommodated in the plurality of cavities.

If the UTP module and the STP module are accommodated in the same first housing in this way, it is not necessary to provide housings respectively corresponding to UTP specifications using the UTP module and STP specifications using the STP module. Further, the second connector as a connection partner of the first housing also needs not be separately provided with housings respectively corresponding to the UTP specifications using the UTP module and the STP specifications using the STP module. For example, if the second connector is a board connector, it is sufficient to install one housing commonly used for the UTP specifications and the STP specifications on a circuit board. Thus, a connector occupied area can be reduced and space saving can be realized as compared to the case where housings are separately provided. Further, since a connecting operation needs not be performed respectively for the UTP specifications and for the STP specifications, the number of connections can be reduced and workability is excellent.

(3) The shield member may include a plurality of tube portions, the UTP inner conductors and the outer conductors may be respectively accommodated in the plurality of tube portions, and the outer conductors may be in contact with inner surfaces of the tube portions.

By arranging the UTP inner conductors and the outer conductors inside the respective tube portions in this way, shielding property of the STP modules and characteristic impedances of the UTP modes can be both satisfactorily adjusted. Further, since some or all of the plurality of tube portions can be selected and used, versatility is excellent.

(4) The UTP module may include an electrically conductive impedance adjusting member to be mounted on the UTP cable, the plurality of cavities may respectively have the same length, and the impedance adjusting member may be set to a length to be accommodated inside the cavity with the UTP module accommodated in the cavity.

In the case of accommodating the UTP module and the STP module in the respective cavities having the same length in this way, a length of the UTP module is matched with that of the STP module if the impedance adjusting member is set to a length to be accommodated inside the cavity. As a result, the impedance adjusting member becomes shorter and there is a concern that a characteristic impedance increases and is degraded. However, in the case of this configuration, since the outer peripheries of the UTP inner conductors are covered by the shield member, the characteristic impedance can be maintained or improved. Note that since the UTP inner conductors are not originally covered with metal or the like, the characteristic impedance tends to increase and a relatively long impedance adjusting member has been conventionally used to lower this characteristic impedance.

(5) The shield member may be formed by die casting.

If the shield member is formed by die casting in this way, shielding property can be improved.

Details of Embodiment of Present Disclosure

A specific example of an embodiment of the present disclosure is described below with reference to the drawings. Note that the present invention is not limited to this illustration and is intended to be represented by claims and include all changes in the scope of claims and in the meaning and scope of equivalents.

Figure 2:
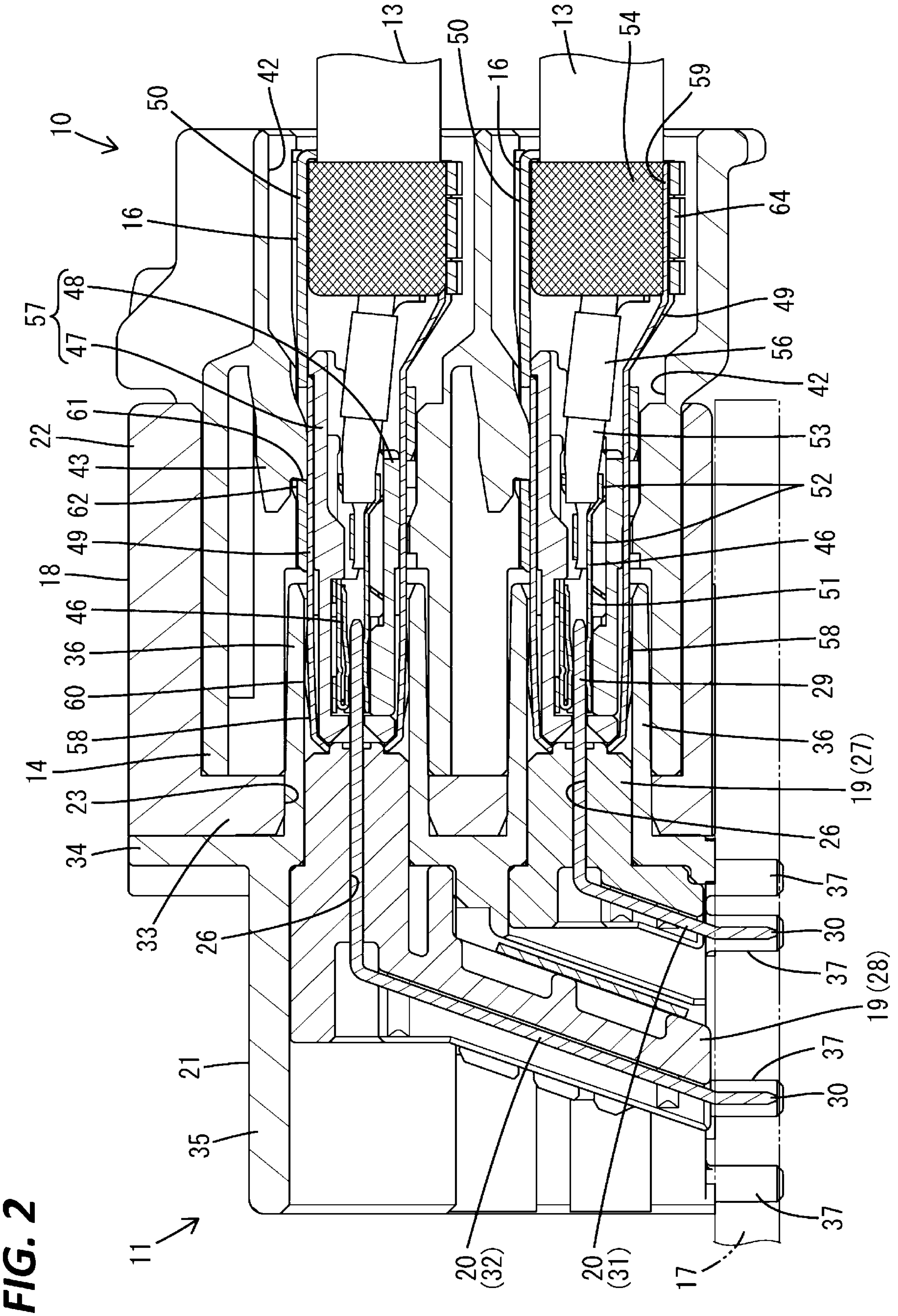
FIG. 2 is a side view in section cut at the position of the cavities accommodating STP modules in the connected state of the first connector and the second connector.

A connector of this embodiment is provided with a first connector 10 and a second connector 11 connectable to each other as shown in FIGS. 1 and 2. The first connector 10 is provided on an end part of a UTP cable 12 (see FIG. 1) or a STP cable 13 (see FIG. 2), in which cable a communication signal is transmitted, and provided with a first housing 14, UTP modules 15 (see FIG. 1) and STP modules 16 (see FIG. 2). The second connector 11 is mounted on a circuit board 17, and provided with a second housing 18, a second dielectric 19, terminals 20 and a shield member 21. Note that, in the following description, surface sides facing each other when the connection of the first and second connectors 10, 11 is started are referred to as front sides concerning a front-rear direction. A vertical direction is based on a vertical direction of each figure.

<Second Housing>

Figure 3:
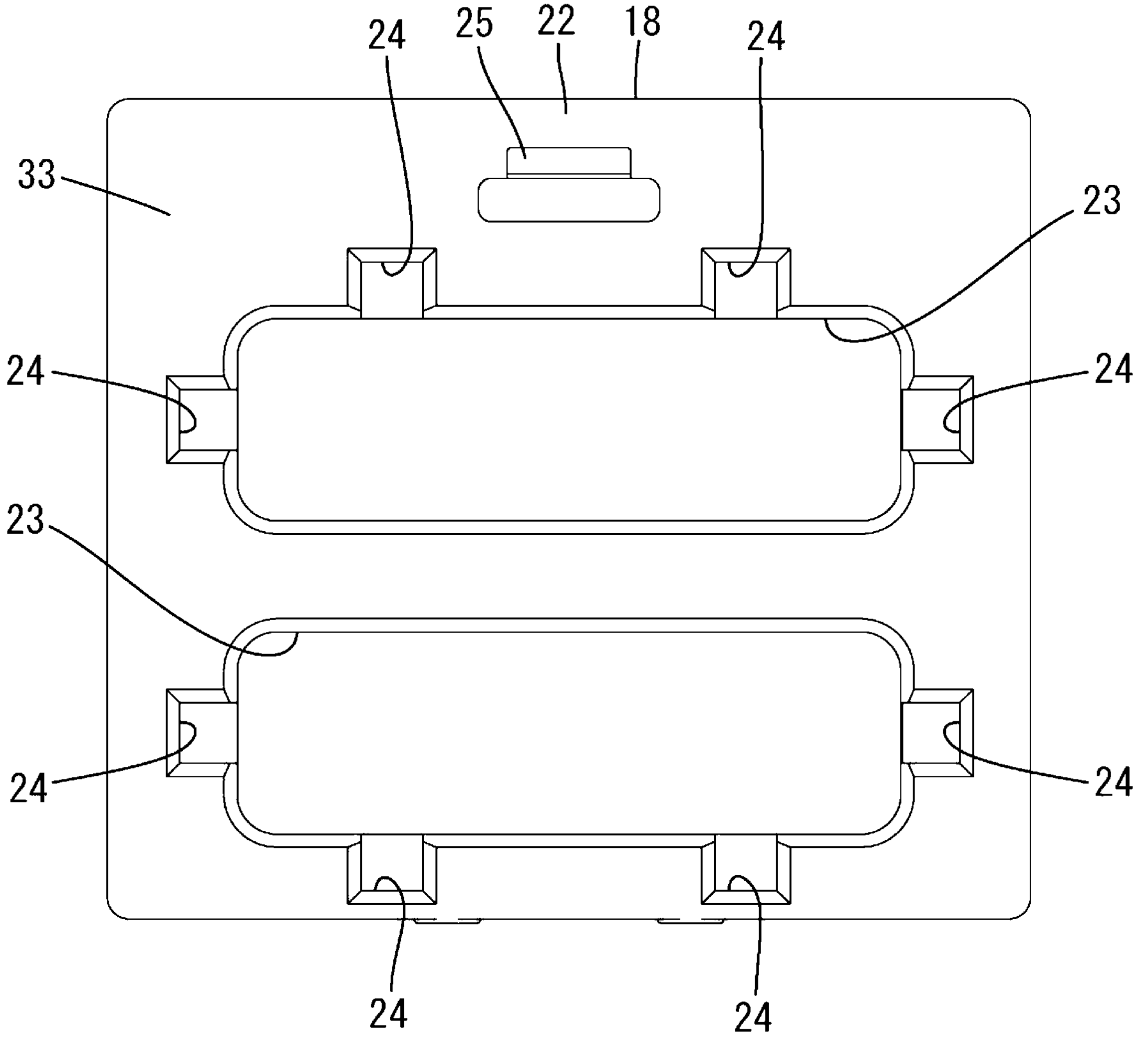
FIG. 3 is a back view of a second housing.

The second housing 18 is made of an insulating synthetic resin material and includes a fitting tube portion 22 in the form of a rectangular tube (front side of FIG. 3, not shown). As shown in FIG. 3, a rear wall 33 of the fitting tube portion 22 is formed with a pair of upper and lower through holes 23. Each through hole 23 has an opening shape extending long in a lateral direction. Further, the rear wall 33 of the fitting tube portion 22 is formed with a plurality of press-fit recesses 24. Each press-fit recess 24 has a rectangular shape in a back view and is open in the rear surface of the rear wall 33. Further, each press-fit recess 24 communicates with the inner peripheral surface of the through hole 23. Specifically, the respective press-fit recesses 24 are open at two left and right positions on the upper surface of the upper through hole 23, one vertical center position on each of the left and right surfaces of the upper through hole 23, two left and right positions on the lower surface of the lower through hole 23 and one vertical center position on each of the left and right surfaces of the lower through hole 23. Although not shown in detail, a lock portion 25 is formed on the upper surface of the upper wall of the fitting tube portion 22.

<Second Dielectric>

The second dielectric 19 is formed of an insulating synthetic resin material into a block and includes, as shown in FIGS. 1 and 2, a pair of left and right mounting holes 26 penetrating in the front-rear direction (only one is shown in FIGS. 1 and 2). The terminal 20 is press-fit into the mounting hole 26 of the second dielectric 19 from behind. In the case of this embodiment, the second dielectric 19 is composed of two types of dielectrics, i.e. lower-stage dielectrics 27 to be arranged in the lower through hole 23 and upper-stage dielectrics 28 to be arranged in the upper through hole 23. A pair of the upper-stage dielectrics 27 and a pair of the lower-stage dielectrics 28 are provided in the second connector 11 and respectively arranged side by side in the lateral direction (direction perpendicular to the planes of FIGS. 1 and 2).

<Terminals>

The terminal 20 is made of an electrically conductive metal plate and formed to be elongated as a whole as shown in FIGS. 1 and 2. The terminal 20 includes an inner conductor connecting portion 29 and a board connecting portion 30. The inner conductor connecting portion 29 extends in the front-rear direction and a rear part thereof is press-fit and held in the second dielectric 19. In the case of this embodiment, the terminals 20 come in two types, i.e. short lower-stage terminals 31 to be press-fit into the lower-stage dielectrics 27 and long upper-stage terminals 32 to be inserted into the upper-stage dielectrics 28.

A front part of the inner conductor connecting portion 29 projects forward of the second dielectric 19 and is electrically connected to a later-described UTP inner conductor 65 of the later-described UTP module 15 or a later-described STP inner conductor 46 of the later-described STP module 16. The board connecting portion 30 is arranged to extend downward from the rear end of the inner conductor connecting portion 29 behind the second dielectric 19. A lower end part of the board connecting portion 30 is inserted into an unillustrated through hole of the circuit board 17 and soldered and connected to an electrically conductive part of the circuit board 17.

<Shield Member>

Figure 4:
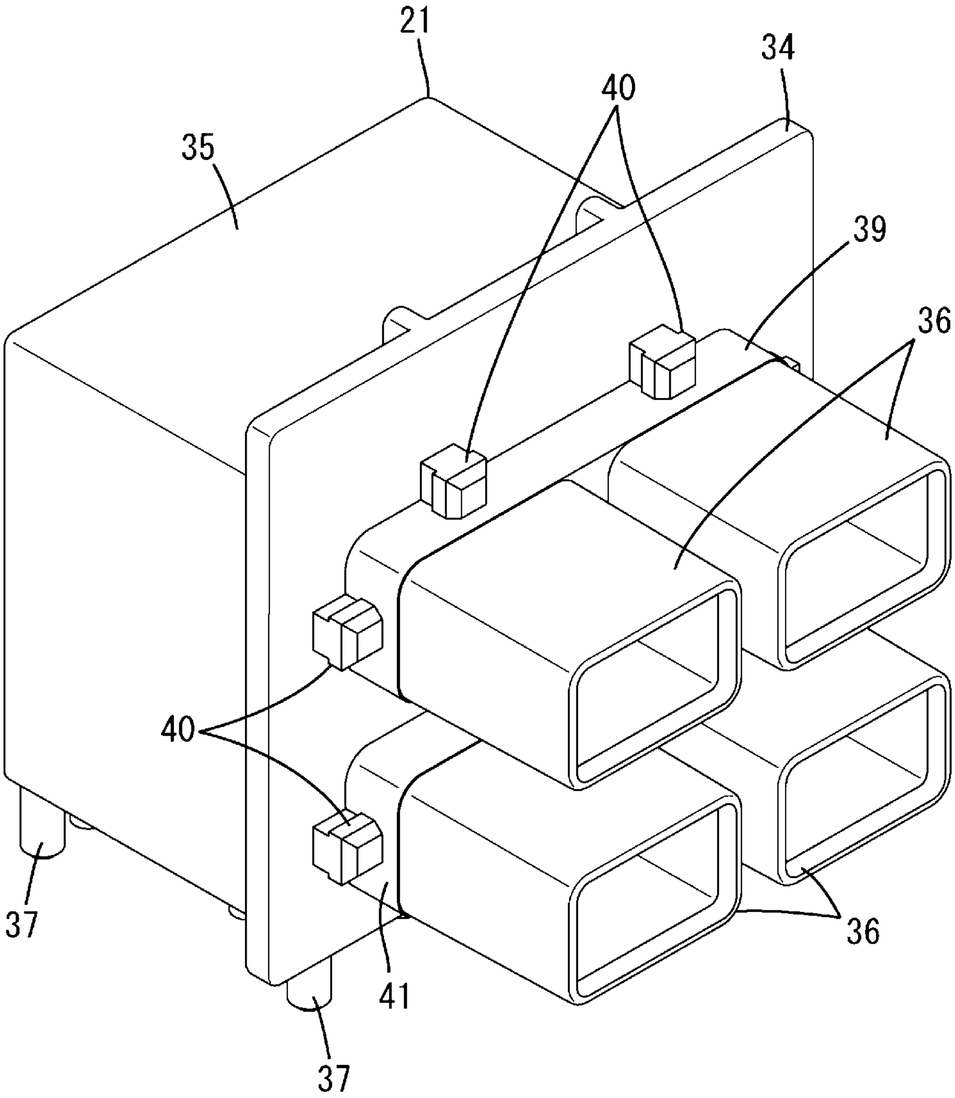
FIG. 4 is a perspective view of a shield member.

The shield member 21 is a cast body and configured as a die-cast member made of zinc alloy in the case of this embodiment. The shield member 21 is assembled with the second housing 18 from behind. As shown in FIG. 4, the shield member 21 includes a protruding portion 34, a surrounding portion 35 projecting rearward of the protruding portion 34 and a plurality of tube portions 36 projecting forward of the protruding portion 34. The protruding portion 34 has a rectangular outer shape in a front view and a back view. As shown in FIGS. 1 and 2, the protruding portion 34 is arranged to cover the rear surface of the rear wall 33 of the fitting tube portion 22 when the shield member 21 is assembled with the second housing 18.

The surrounding portion 35 is in the form of a gate-shaped frame in a back view (not shown) and is open rearward and downward. Although not shown in detail, the inside of the surrounding portion 35 is laterally divided and the upper-stage and lower-stage dielectrics 28, 27 are accommodated into each divided space. A pair of left mounting protrusions 37 and a pair of right mounting protrusions 37 are formed to project on the lower end of the surrounding portion 35. By inserting the respective mounting protrusions 37 into unillustrated mounting holes of the circuit board 17, the shield member 21 is positioned and installed on the circuit board 17.

As shown in FIG. 4, each tube portion 36 is in the form of a rectangular tube long in the lateral direction and has the same shape. A pair of left and right tube portions 36 are arranged in each of upper and lower stages. The inner periphery of each tube portion 36 penetrates through the protruding portion 34 and communicates with the inside of the surrounding portion 35. As shown in FIGS. 1 and 2, the upper-stage dielectrics 28 are inserted and held in the respective tube portions 36 in the upper stage. The lower-stage dielectrics 27 are inserted and held in the respective tube portions 36 in the lower stage.

As shown in FIG. 4, the respective tube portions 36 in the upper stage are coupled to an upper-stage base portion 39 long in the lateral direction on base end sides connected to the protruding portion 34. The outer peripheral surface of the upper-stage base portion 39 is arranged to collectively surround the base end sides of the respective tube portions 36 in the upper stage. A plurality of press-fitting portions 40 are formed to project at intervals in a circumferential direction on the outer peripheral surface of the upper-stage base portion 39. Each press-fitting portion 40 is in the form of a block having a rectangular cross-section, and coupled to the front surface of the protruding portion 34. Each press-fitting portion 40 is arranged at a position corresponding to each press-fitting recess 24.

Similarly, base end sides of the respective tube portions 36 in the lower stage are also coupled to a lower-stage base portion 41, and a plurality of press-fitting portions 40 are formed at positions corresponding to the respective press-fitting recesses 24 also on the outer peripheral surface of the lower-stage base portion 41. When the shield member 21 is assembled with the second housing 18, the upper-stage and lower-stage base portions 39, 41 are respectively inserted into the upper and lower through holes 23, and the respective press-fitting portions 40 are press-fit into the respective press-fitting recesses 24. In this way, the shield member 21 is held on the second housing 18. The second dielectric 19 is inserted into each tube portion 36 from behind, and the front part of the inner conductor connecting portion 29 is arranged to project into each tube portion 36. Further, the UTP module 15 or STP module 16 is inserted into each tube portion 36 from front. Since each tube portion 36 has no opening part such as a hole, the intrusion and leakage of noise can be satisfactorily suppressed and shielding performance and characteristic impedance adjustability are excellent.

<First Housing>

Figure 5:
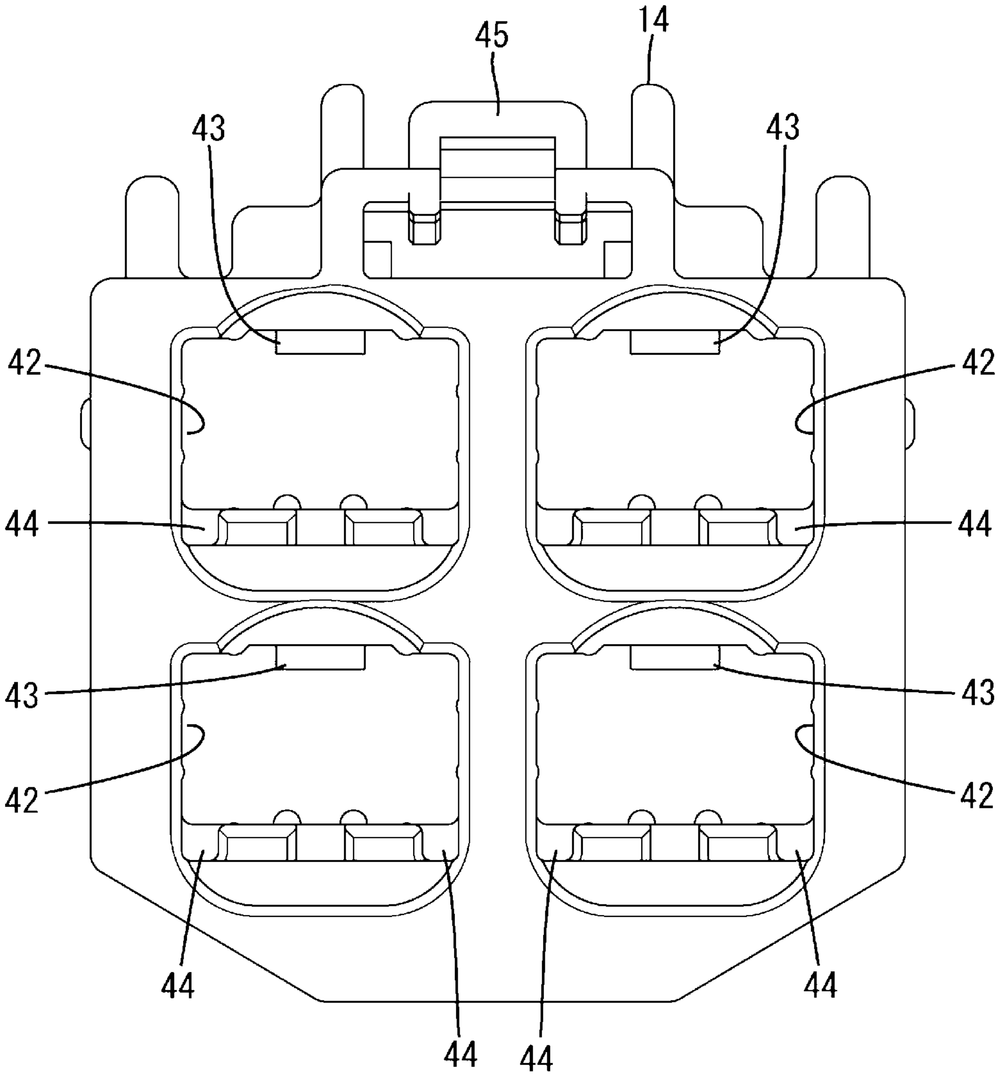
FIG. 5 is a back view of a first housing.

The first housing 14 is formed of an insulating synthetic resin material and has an outer peripheral shape with a rectangular cross-section. As shown in FIGS. 1 and 2, the first housing 14 is fit into the fitting tube portion 22 of the second housing 18. The first housing 14 is formed with a plurality of cavities 42 penetrating in the front-rear direction. The respective cavities 42 are individually formed at positions corresponding to the respective tube portions 36. As shown in FIG. 5, the respective cavities 42 are set to have the same opening shape and the same front-rear length.

A locking lance 43 is formed to project forward on the upper surface of the inner wall of each cavity 42. The locking lance 43 is resiliently deformable in the vertical direction. As shown in FIG. 5, a pair of rear surfaces 44 facing rearward are formed in left and right end parts of the lower surface of the inner wall of each cavity 42. The UTP module 15 or STP module 16 is inserted into each cavity 42 from behind. The UTP module 15 or STP module 16 can be restricted from coming out rearward by being locked by the locking lance 43 (see FIGS. 1 and 2), and can be restricted from coming out forward by abutting on the rear surfaces 44. Note that each cavity 42 has a front-rear length exceeding those of the UTP module 15 and STP module 16 and can entirely accommodate each of the UTP module 15 and STP module 16.

As shown in FIG. 5, a lock arm 45 is formed on the upper wall of the first housing 14. The lock arm 45 is resiliently deformable in the vertical direction. The first connector 10 is inserted into the fitting tube portion 22 from a side backward of the plane of FIG. 3 and the lock arm 45 is locked to the lock portion 25, whereby the first and second connectors 10, 11 are held in a connected state.

<STP Module>

Figure 6:
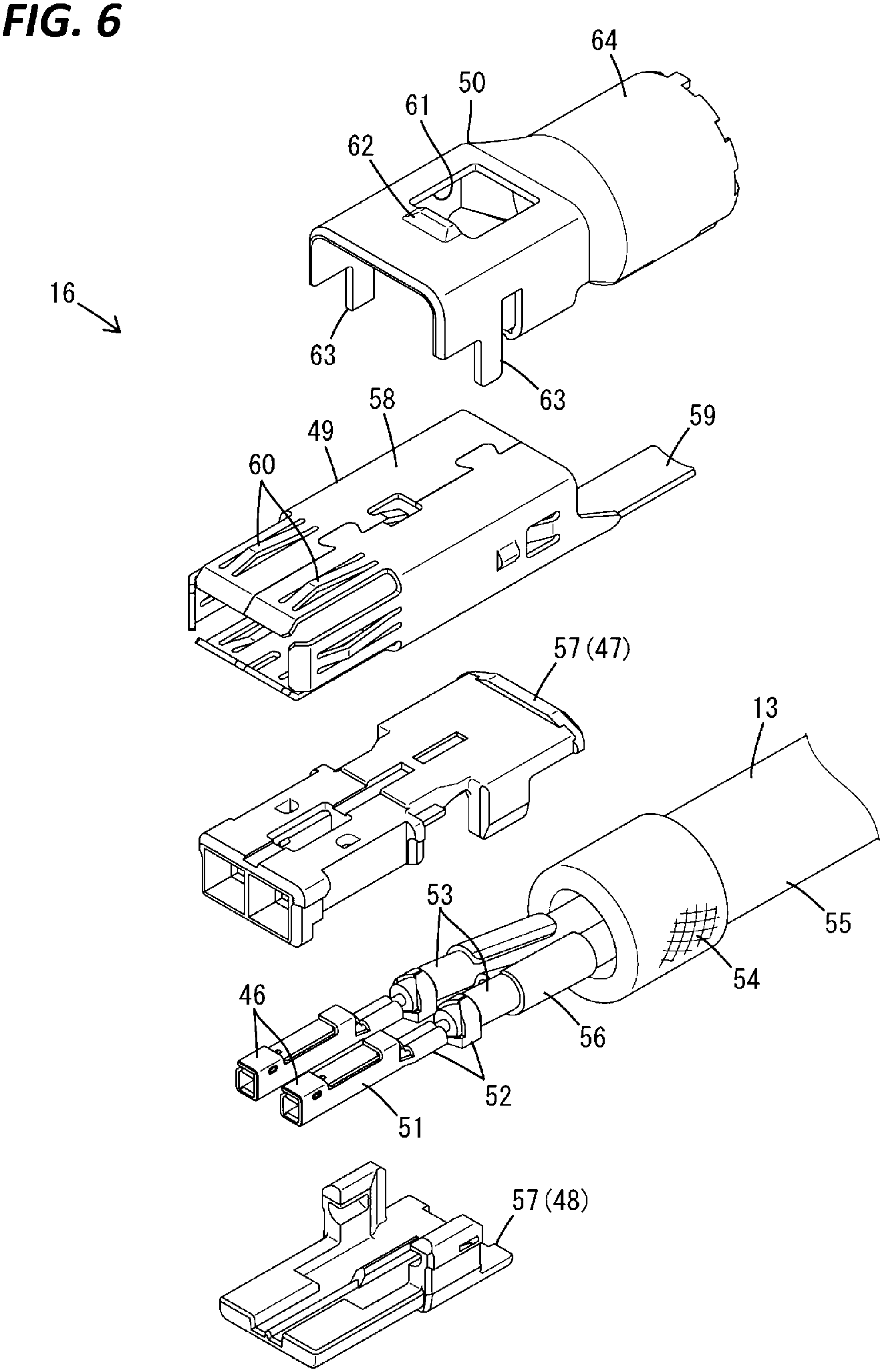
FIG. 6 is an exploded perspective view of the STP module.

As shown in FIG. 6, the STP module 16 includes two STP inner conductors 46, a STP upper dielectric 47, a STP lower dielectric 48, an outer conductor 49 and an outer conductor cover 50.

The STP inner conductor 46 is a female terminal and formed, such as by bending an electrically conductive metal plate material. The STP inner conductor 46 includes a tubular box portion 51 in a front part and a barrel portion 52 in the form of an open barrel in a rear part. A front part of the inner conductor connecting portion 29 is inserted into the box portion 51 and electrically connected when the first and second connectors 10, 11 are connected. The barrel portion 52 is connected to a wire 53 of the STP cable 13.

The STP cable 13 is a shielded twisted pair cable and includes two wires 53, a shield body 54 such as a braided wire for collectively covering the outer peripheries of the respective wires 53, and an insulating sheath 55 for covering the outer periphery of the shield body 54.

The sheath 55 is removed in an end part of the STP cable 13 and the respective wires 53 are exposed laterally side by side. An end part of the shield body 54 is folded from an end part of the sheath 55 and exposed on an outer peripheral side of the sheath 55. Parts of the respective wires 53 exposed between the end part of the sheath 55 and the STP inner conductors 46 are coupled to each other by a clip 56 for adjusting a characteristic impedance.

The STP upper dielectric 47 and the STP lower dielectric 48 are formed of an insulating synthetic resin material and assembled with each other in the vertical direction to constitute an integrated STP dielectric 57. The two STP inner conductors 46 are accommodated side by side in the lateral direction in the STP dielectric 57 while being respectively connected to the wires 53.

The outer conductor 49 is formed, such as by bending an electrically conductive metal plate material. As shown in FIG. 6, the outer conductor 49 includes a fitting portion 58 in the form of a rectangular tube long in the front-rear direction and a shield connecting portion 59 to be connected to the shield body 54 of the STP cable 13 as shown in FIG. 2. The STP dielectric 57 is inserted and accommodated into the tube portion 36 from behind. The STP inner conductors 46 are electrically insulated from the outer conductor 49 by the STP dielectric 57. As shown in FIG. 6, the fitting portion 58 is formed with a plurality of resilient contact portions 60 by cutting and raising. When the first and second connectors 10, 11 are connected, the fitting portion 58 is inserted into the tube portion 36 of the shield member 21 and the respective resilient contact portions 60 contact the inner surface of the tube portion 36. In this way, the outer conductor 49 and the shield member 21 are electrically connected.

The shield connecting portion 59 is in the form of a strip plate extending rearward from the lower edge of the rear end of the fitting portion 58. As shown in FIG. 2, the shield connecting portion 59 is arranged below the shield body 54 and connected to the shield body 54 by receiving a crimping force of a later-described shield barrel portion 64 of the outer conductor cover 50.

The outer conductor cover 50 is formed, such as by bending an electrically conductive metal plate material. A rear part of the fitting portion 58 of the outer conductor 49 is arranged inside a front part of the outer conductor cover 50. As shown in FIG. 6, the upper wall of a front part of the outer conductor cover 50 is formed with a rectangular opening hole 61 and a housing locking portion 62 projecting upward from the front edge of the opening hole 61. Left and right side walls of the front part of the outer conductor cover 50 are formed with stopper portions 63 in the form of strip plates projecting downward. If the STP module 16 is inserted into the cavity 42 of the first housing 14 from behind, the locking lance 43 is fit into the opening hole 61 and arranged to be lockable to the housing locking portion 62 and the STP module 16 is retained in the cavity 42 as shown in FIG. 2. Further, the STP module 16 is stopped in front in the cavity 42 by the abutment of the respective stopper portions 63 on the rear surfaces 44 of the first housing 14.

A rear part of the outer conductor cover 50 is formed with the shield barrel portion 64. As shown in FIG. 2, the shield barrel portion 64 is crimped and connected to the shield body 54 of the STP cable 13 while the shield connecting portion 59 of the outer conductor 49 is arranged inside. Note that the shield barrel portion 64 of FIG. 6 is shown in a form crimped to the shield body 54 of the STP cable 13 after deformation for the sake of convenience. To be precise, the shield barrel portion 64 is in the form of an open barrel before deformation.

<UTP Module>

Figure 8:
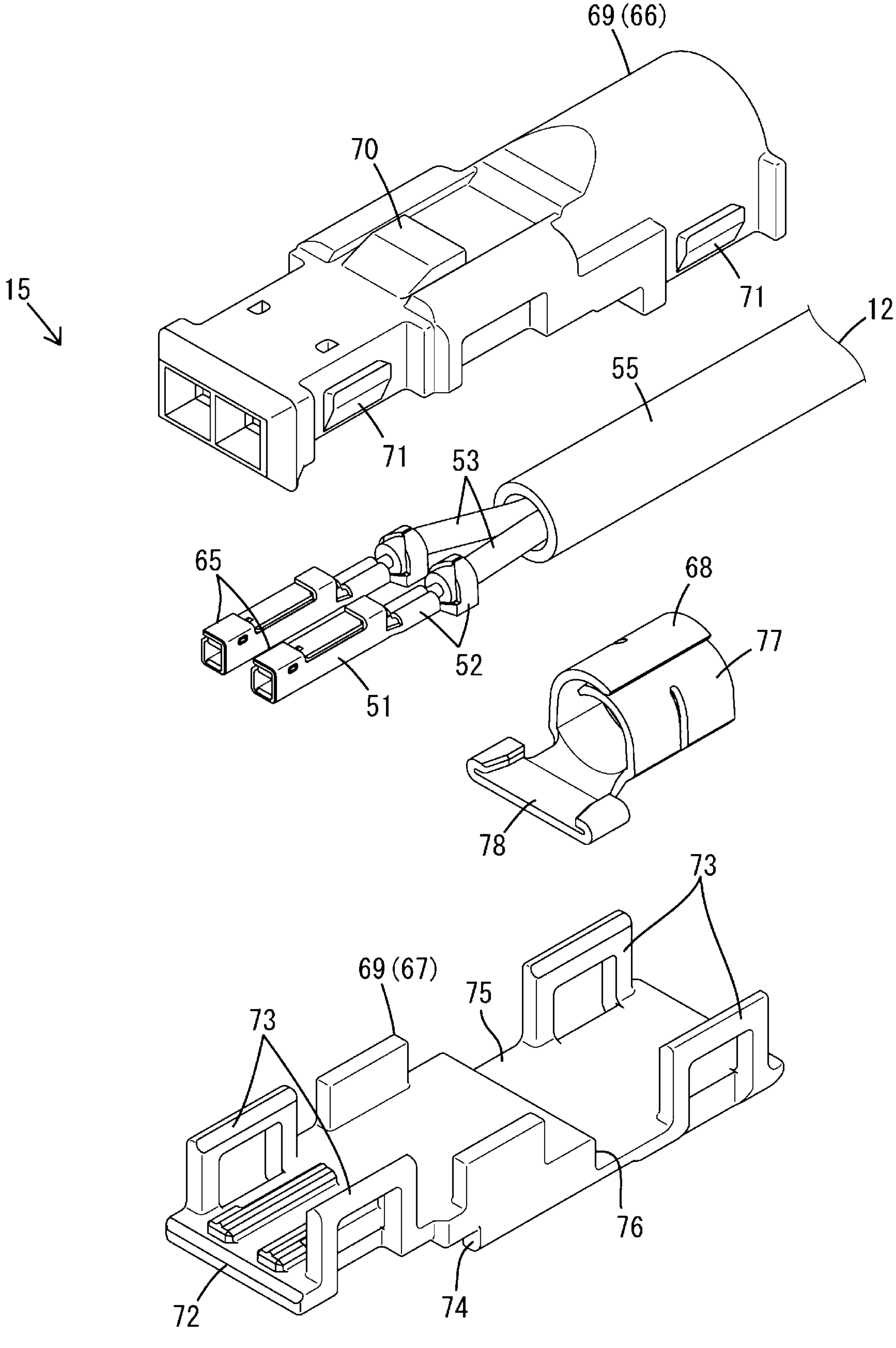
FIG. 8 is an exploded perspective view of the UTP module.

As shown in FIG. 8, the UTP module 15 includes two UTP inner conductors 65, a UTP upper dielectric 66, a UTP lower dielectric 67 and an impedance adjusting member 68.

The UTP inner conductor 65 is a female terminal having the same shape as the STP inner conductor 46 and, similarly to the STP inner conductor 46, includes a tubular box portion 51 and a barrel portion 52. The barrel portion 52 is connected to a wire 53 of the UTP cable 12. The UTP cable 12 is an unshielded twisted pair cable and includes all the components of the STP cable 13 except the shield body 54. That is, the UTP cable 12 is composed of two wires 53 and a sheath 55.

The UTP upper dielectric 66 and the UTP lower dielectric 67 are formed of an insulating synthetic resin material and assembled with each other in the vertical direction to constitute an integrated UTP dielectric 69. The two UTP inner conductors 65 are accommodated side by side in the lateral direction in the UTP dielectric 69 while being respectively connected to the wires 53.

A housing lock portion 70 is formed to project on the upper surface of the UTP upper dielectric 66. If the UTP upper dielectric 66 is inserted into the cavity 42 of the first housing 14 from behind, the locking lance 43 is arranged to be lockable to the housing lock portion 70 and the UTP module 15 is retained in the cavity 42 as shown in FIG. 1. Further, as shown in FIG. 8, a pair of front and rear lock projections 71 are formed on a lower end part of each of left and right side surfaces of the UTP upper dielectric 66.

Figure 9:
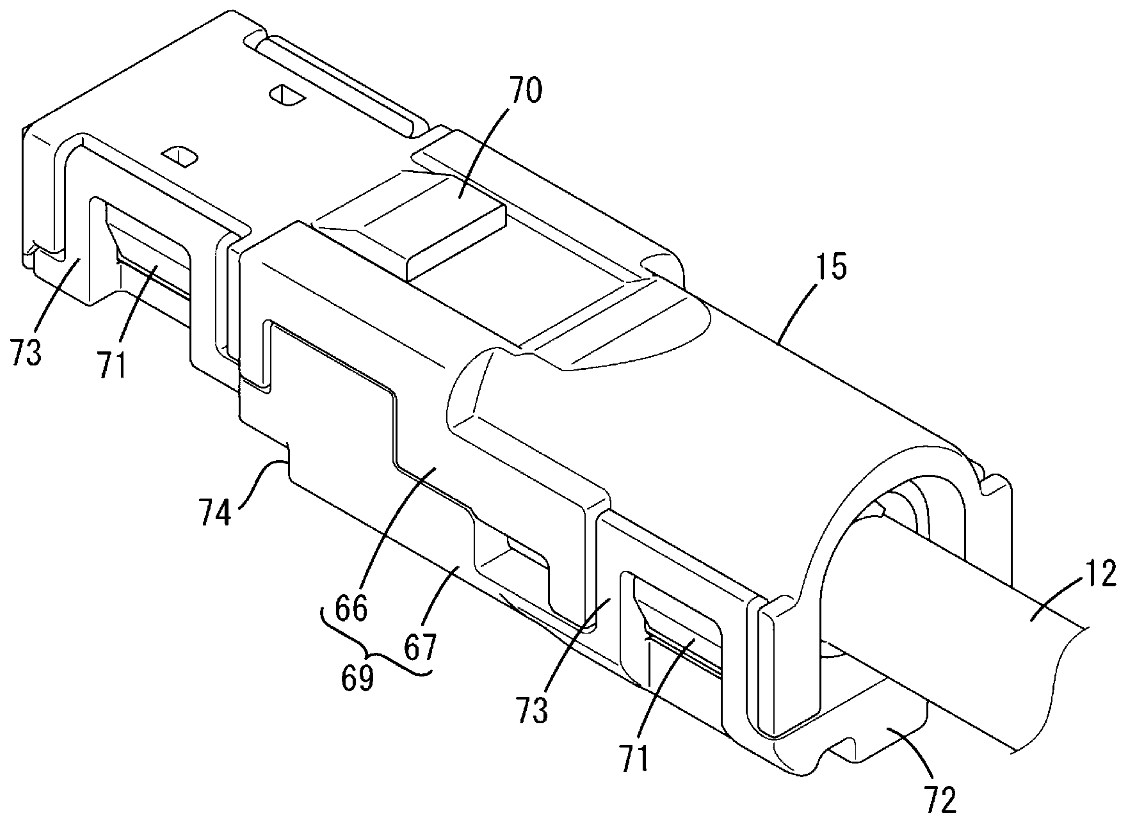
FIG. 9 is a perspective view of the UTP module.

The UTP lower dielectric 67 includes a plate-like body portion 72 and a pair of front and rear resilient lock portions 73 rising from each of left and right side edges of the body portion 72. As shown in FIG. 9, the respective resilient lock portions 73 lock the respective lock projections 71, whereby the UTP dielectric 69 is held in a united state. A stepped stopper surface 74 facing forward is formed on the lower surface of the UTP lower dielectric 67. The stopper surface 74 abuts on the rear surfaces 44 of the first housing 14, whereby the UTP module 15 is stopped in front in the cavity 42.

A flat mounting surface 75 is formed on the upper surface of a rear part of the body portion 72. A step portion 76 defining the front end of the mounting surface 75 is provided forward of a pair of the rear resilient lock portions 73 on the upper surface of the body portion 72. The upper surface of a front part of the body portion 72 is arranged higher than the mounting surface 75 via the step portion 76.

The impedance adjusting member 68 is formed, such as by bending an electrically conductive metal plate material. The impedance adjusting member 68 includes a crimping portion 77 to be cylindrically wound on and crimped to the outer peripheral surface of the sheath 55 of the UTP cable 12 as shown in FIG. 1 and an installation portion 78 in the form of a flat plate projecting forward from the lower edge of the front end of the crimping portion 77 and protruding toward both left and right sides as shown in FIG. 8. The impedance adjusting member 68 is arranged to face the mounting surface 75 of the UTP lower dielectric 67, and locates the installation portion 78 forward of the respective rear resilient lock portions 73. The impedance adjusting member 68 is restricted from lifting upward by the UTP upper dielectric 66 assembled with the UTP lower dielectric 67.

<Functions>

Figure 7:
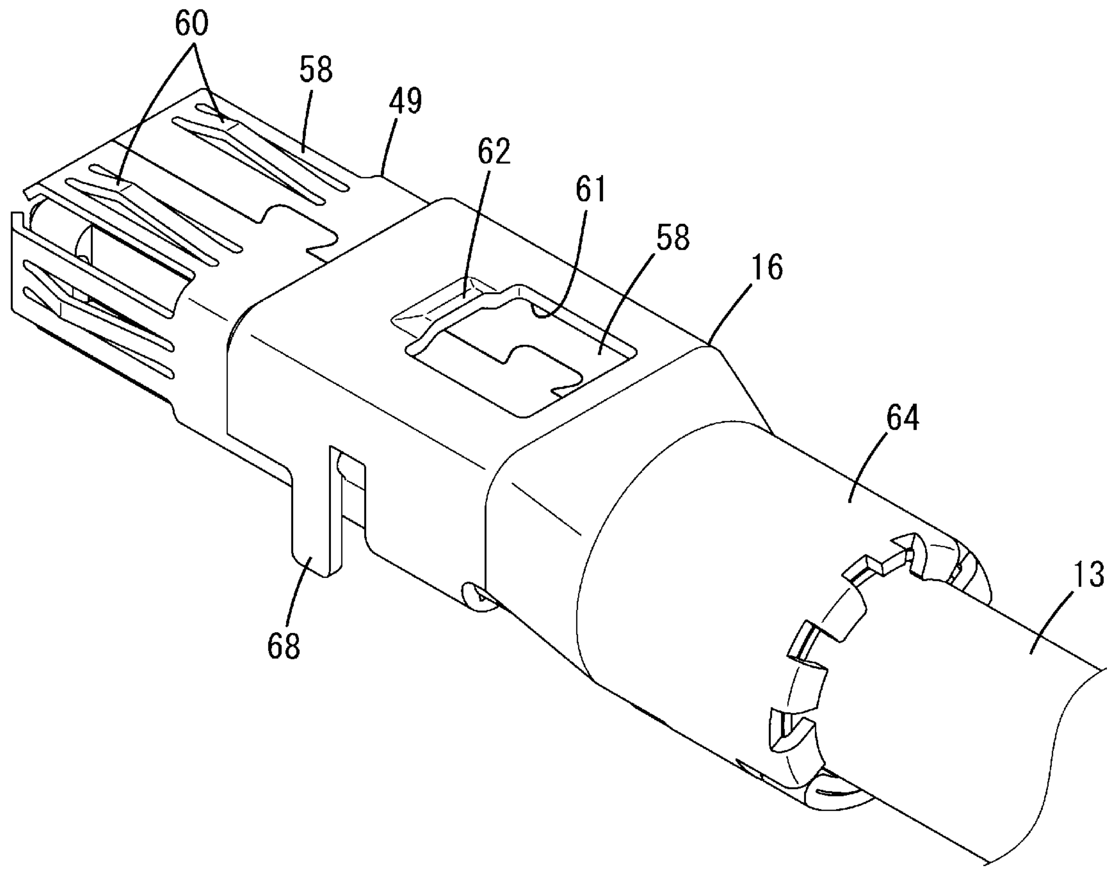
FIG. 7 is a perspective view of the STP module.

As shown in FIG. 7, the STP module 16 is formed in a state connected to the end part of the STP cable 13. The STP inner conductors 46 are accommodated inside the STP module 16, and the outer conductor 49 and the outer conductor cover 50 are arranged in an exposed manner outside the STP module 16. On the other hand, as shown in FIG. 9, the UTP module 15 is formed in a state connected to the end part of the UTP cable 12. The UTP inner conductors 65 are accommodated inside the UTP module 15, and the UTP dielectric 69 is arranged in an exposed manner outside the UTP module 15.

The UTP modules 15 and the STP modules 16 have the same or nearly the same front-rear length and outside dimensions. The UTP modules 15 and the STP modules 16 are both accommodated into the first housing 14. The first housing 14 is formed with the plurality of cavities 42 for separately accommodating the UTP modules 15 and the STP modules 16. The respective cavities 42 are formed to have the same shape.

Thus, the UTP modules 15 and the STP modules 16 can be respectively accommodated into the appropriate cavities 42, out of the respective cavities 42 of the first housing 14. That is, an array of the UTP modules 15 and the STP modules 16 accommodated in the respective cavities 42 is arbitrary and can be, for example, determined according to an array of the electrically conductive paths of the circuit board 17. Further, the number of the UTP modules 15 and the number of the STP modules 16 are also arbitrary, and the UTP modules 15 and the STP modules 16 need not be accommodated into all the cavities 42.

FIG. 2 illustrates a case where two STP modules 16 are accommodated in the cavities 42 in the upper and lower stages on one lateral side. As shown in FIG. 2, with the first and second connectors 10, 11 connected, the front parts of the STP modules 16 are inserted in the corresponding tube portions 36 of the shield member 21 and the outer conductors 49 are connected to the tube portions 36 via the respective resilient contact portions 60. In this way, a shield structure continuous in the front-rear direction is formed between the first and second connectors 10, 11.

Further, FIG. 1 illustrates a case where two UTP modules 15 are accommodated in the cavities 42 in the upper and lower stages on one lateral side. As shown in FIG. 1, with the first and second connectors 10, 11 connected, the front parts of the UTP modules 15 are inserted in the corresponding tube portions 36 of the shield member 21 and the tube portions 36 are arranged to cover the outer peripheries of connected parts of the box portions 51 of the UTP inner conductors 65 and the inner conductor connecting portions 29 of the terminals 20. In this way, adjusting portions 79 for adjusting a characteristic impedance are formed on outer peripheral sides of the UTP inner conductors 65 via the UTP dielectrics 69. Note that the UTP modules 15 are arranged out of contact with the tube portions 36.

In the case of this embodiment, it is difficult to ensure a sufficient front-rear length for the cavities 42 due to a request for miniaturization of the connector. Further, since the UTP modules 15 and the STP modules 16 have the same or nearly the same front-rear length, the front-rear lengths of the UTP modules 15 become shorter than before and the front-rear lengths of the impedance adjusting members 68 accommodated in the UTP modules 15 also become shorter than before.

However, in the case of this embodiment, since the adjusting portion 79 is formed by covering the outer peripheral sides of the UTP inner conductors 65 by the tube portion 36 as described above, a reduction in characteristic impedance adjusting function due to the shortening of the impedance adjusting member 68 can be compensated and the characteristic impedance adjusting function can be further improved.

Further, in the case of this embodiment, since the UTP modules 15 and the STP modules 16 are accommodated in the common first housing 14, it is not necessary to provide a dedicated UTP housing for accommodating the UTP modules 15 and a dedicated STP housing for accommodating the STP modules 16, respectively. That is, in this embodiment, it is not necessary to provide connectors respectively corresponding to UTP specifications and STP specifications and the number of components can be reduced. Particularly, since the second connector 11 is mounted on the circuit board 17, a connector occupied area on a surface of the circuit board 17 can be reduced, which can contribute to space saving. Further, since a connecting operation needs not be performed respectively for UTP specifications and for STP specifications, the number of connections can be reduced and workability can be improved.

Moreover, in the case of this embodiment, the shield member 21 includes the plurality of tube portions 36 and the UTP modules 15 and the STP modules 16 can be selectively accommodated in some or all of the tube portions 36 according to the specifications. Thus, versatility is excellent.

Other Embodiments of Present Disclosure

The embodiment disclosed this time should be considered illustrative in all aspects, rather than restrictive.

As another embodiment, the first connector may include only the UTP modules without including the STP modules.

As another embodiment, the first connector may be configured to adjust the characteristic impedance only by the tube portions without including the impedance adjusting members. For example, if a sufficient front-rear length cannot be ensured for the UTP modules from the viewpoint of miniaturizing the connector, the impedance adjusting members can be omitted from the first connector.

As another embodiment, the UTP module may be configured to contact the inner surface of the tube portion.

As another embodiment, the tube portion of the shield member may be configured to collectively cover the plurality of UTP modules and STP modules.

As another embodiment, the shield member may be formed, such as by bending an electrically conductive metal plate material.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising a first connector and a second connector connectable to each other, wherein:
- the first connector includes a UTP module and a first housing,
- the UTP module includes UTP inner conductors to be connected to wires of a UTP cable, and
- the second connector includes an electrically conductive shield member for covering outer peripheries of the UTP inner conductors with the first and second connectors connected.

2. The connector of claim 1, wherein:
- the first connector includes a STP module,
- the STP module includes STP inner conductors to be connected to wires of a STP cable and an outer conductor to be connected to a shield body of the STP cable,
- the first housing includes a plurality of cavities, either or both of the UTP module and the STP module are accommodated in
the plurality of cavities, and
when the STP module is accommodated in the plurality of cavities, the shield member is in contact with the outer conductor with the first and second connectors connected.

3. The connector of claim 2, wherein:
the shield member includes a plurality of tube portions,
either or both of the UTP inner conductors and the outer conductors are accommodated in the plurality of tube portions, and
when the outer conductors are accommodated in the plurality of tube portions, the outer conductors are in contact with inner surfaces of the tube portions.

4. The connector of claim 2, wherein:
the UTP module includes an electrically conductive impedance adjusting member to be mounted on the UTP cable,
the plurality of cavities respectively have the same length, and
the impedance adjusting member is set to a length to be accommodated inside the cavity with the UTP module accommodated in the cavity.

5. The connector of claim 1, wherein the shield member is formed by die casting.

* * * * *